United States Patent
Levanon et al.

(10) Patent No.: US 8,078,470 B2
(45) Date of Patent: Dec. 13, 2011

(54) SYSTEM FOR INDICATING EMOTIONAL ATTITUDES THROUGH INTONATION ANALYSIS AND METHODS THEREOF

(75) Inventors: Yoram Levanon, Ramat Hasharon (IL); Lan Lossos, Zur Hadassa (IL)

(73) Assignee: Exaudios Technologies Ltd., Ramat Gan (IL)

( * ) Notice: Subject to any disclaimer, the term of this patent is extended or adjusted under 35 U.S.C. 154(b) by 845 days.

(21) Appl. No.: 12/158,379

(22) PCT Filed: Dec. 20, 2006

(86) PCT No.: PCT/IL2006/001464
§ 371 (c)(1),
(2), (4) Date: Jun. 20, 2008

(87) PCT Pub. No.: WO2007/072485
PCT Pub. Date: Jun. 28, 2007

(65) Prior Publication Data
US 2008/0270123 A1 Oct. 30, 2008

Related U.S. Application Data

(60) Provisional application No. 60/752,399, filed on Dec. 22, 2005.

(51) Int. Cl.
*G10L 11/04* (2006.01)
(52) U.S. Cl. .................................. 704/273; 704/270
(58) Field of Classification Search .................. None
See application file for complete search history.

(56) References Cited

U.S. PATENT DOCUMENTS

| | | | |
|---|---|---|---|
| 3,971,034 A | 7/1976 | Bell, Jr. et al. | |
| 4,093,821 A * | 6/1978 | Williamson | 704/207 |
| 4,142,067 A * | 2/1979 | Williamson | 704/258 |
| 4,490,840 A | 12/1984 | Jones | |
| 5,148,483 A * | 9/1992 | Silverman | 704/274 |
| 5,976,081 A * | 11/1999 | Silverman | 600/300 |
| 6,006,188 A | 12/1999 | Bogdashevsky et al. | |
| 6,055,501 A * | 4/2000 | MacCaughelty | 704/272 |
| 6,151,571 A * | 11/2000 | Pertrushin | 704/209 |

(Continued)

FOREIGN PATENT DOCUMENTS

EP 1 318 505 6/2003
(Continued)

OTHER PUBLICATIONS

Written Opinion of the International Searching Authority for PCT/IL2006/001464 filed Dec. 20, 2006.
(Continued)

*Primary Examiner* — Talivaldis Ivars Smits
(74) *Attorney, Agent, or Firm* — Martin Fleit; Paul D. Bianco; Fleit Gibbons Gutman Bongini & Bianco PL

(57) ABSTRACT

The present invention discloses means and method for indicating emotional attitudes of a speaker, either human or animal, according to voice intonation. The invention also discloses a method for advertising, marketing, educating, or lie detecting by indicating emotional attitudes of a speaker and a method of providing remote service by a group comprising at least one observer to at least one speaker. The invention also discloses a system for indicating emotional attitudes of a speaker comprising a glossary of intonations relating intonations to emotions attitudes.

14 Claims, 6 Drawing Sheets

U.S. PATENT DOCUMENTS

Figure 1:
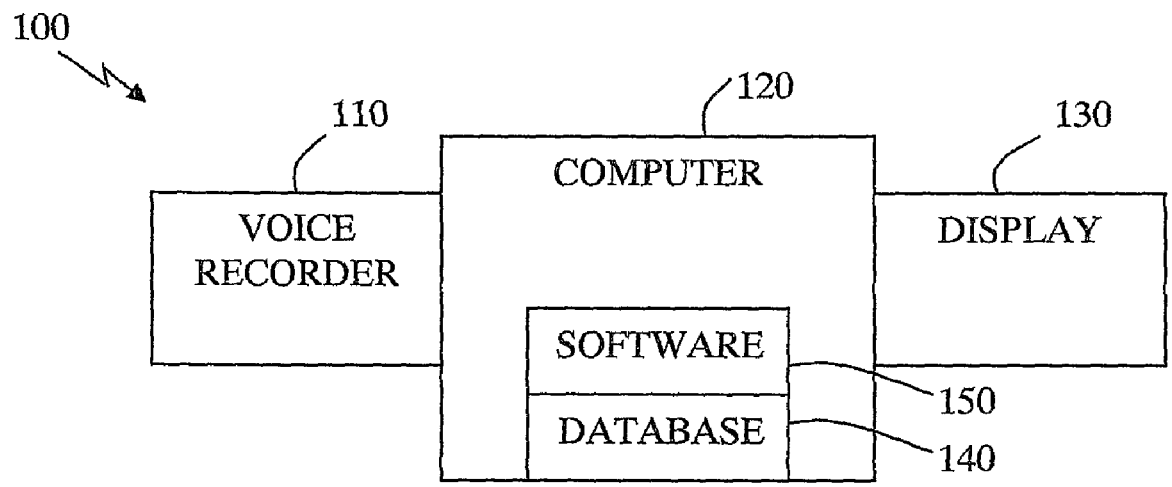

| | | | |
|---|---|---|---|
| 6,275,806 B1 * | 8/2001 | Pertrushin | 704/272 |
| 6,289,313 B1 * | 9/2001 | Heinonen et al. | 704/270 |
| 6,353,810 B1 * | 3/2002 | Petrushin | 704/236 |
| 6,363,346 B1 * | 3/2002 | Walters | 704/231 |
| 6,427,137 B2 | 7/2002 | Petrushin | |
| 6,463,415 B2 * | 10/2002 | St. John | 704/273 |
| 6,480,826 B2 * | 11/2002 | Pertrushin | 704/270 |
| 6,591,238 B1 | 7/2003 | Silverman | |
| 6,638,217 B1 * | 10/2003 | Liberman | 600/300 |
| 6,697,457 B2 * | 2/2004 | Petrushin | 379/88.08 |
| 6,719,707 B1 * | 4/2004 | Montgomery | 600/586 |
| 7,062,443 B2 * | 6/2006 | Silverman et al. | 704/274 |
| 7,139,699 B2 * | 11/2006 | Silverman et al. | 704/206 |
| 7,165,033 B1 * | 1/2007 | Liberman | 704/270 |
| 7,222,075 B2 * | 5/2007 | Petrushin | 704/270 |
| 7,451,079 B2 * | 11/2008 | Oudeyer | 704/205 |
| 7,729,914 B2 * | 6/2010 | Tato et al. | 704/270 |
| 7,940,897 B2 * | 5/2011 | Khor et al. | 379/88.02 |

FOREIGN PATENT DOCUMENTS

| | | |
|---|---|---|
| EP | 1 326 445 | 7/2003 |
| WO | WO 01/16939 | 3/2001 |
| WO | WO 2006/059325 | 6/2006 |

OTHER PUBLICATIONS

International Preliminary Report on Patentability for PCT/IL2006/001464 filed Dec. 20, 2006.

Internaional Search Report for PCT/IL2006/001464 filed Dec. 20, 2006.

\* cited by examiner

SYSTEM FOR INDICATING EMOTIONAL ATTITUDES THROUGH INTONATION ANALYSIS AND METHODS THEREOF

CROSS-REFERENCE TO RELATED APPLICATIONS

This application is a national stage of PCT/IL06/01464, filed Dec. 20, 2006, which claims priority to Provisional Application No. 60/752,399, filed Dec. 22, 2005.

FIELD OF THE INVENTION

This invention relates to methods and system for indicating the emotional attitudes of a speaker through intonation analysis.

BACKGROUND OF THE INVENTION

It is common to assume that the pronunciation of words, and in particular the intonation, creates with the listener an understanding of the type of emotional attitude intended by the speaker. A significant part of non-verbal communication between people, and even among animals, is based upon the interpretation of intonation. In human communication, this interpretation is combined with the verbal content, to form a complete understanding.

Interpretation of intonation is used alongside with interpretation of body language and interpretation of content, as an emotional communication tool. This interpretation is intuitive and, to date, an accurate description and decoding has not been provided.

Indeed, various studies have been conducted to understand a speaker's emotional state, but those studies did not relate to the way specific words are pronounced nor were they able to attach a specific emotion to each and every tone.

Among the systems developed until now we can count the following: U.S. Pat. No. 3,971,034, presents a method of detecting psychological stress by evaluating manifestation of physiological change in the human voice; U.S. Pat. No. 6,006,188 compares models of speech with models in a data base, reaching conclusions from a comparison between the models; and other patents that identify situations of stress, characteristic of lying and even attempted suicide are U.S. Pat. No. 6,427,137 and U.S. Pat. No. 6,591,238.

WO 2006/059325 discloses a method and system indicating a condition of an individual by analysis on non-discernible sounds.

A methods and system for: a) indicating emotional attitudes by intonation analysis, related to the way specific words are pronounced or, b) attaching a specific emotion to each and every tone, thus meets a long felt need.

SUMMARY OF THE INVENTION

The present invention thus provides a method and system for indicating emotional attitudes of a speaker by intonation analysis. This analysis is related to the way specific words are pronounced and is also related to the finding that specific emotions are attached to each and every tone.

It is an object of the present invention to provide a method for indicating emotional attitude of a speaker according to intonation. The method comprises defining a set of words; obtaining a database comprising reference intonations, and reference emotional attitudes connected to each of the words within said set of words; repeatedly pronouncing at least one of the words from this set of words by the speaker; recording a plurality of such pronunciations to obtain a signal representing sound magnitude as a function of time; processing said signal to obtain voice characteristics comprising a description of sound magnitude as a first function of frequency; decoding these voice characteristics to identify an intonation; comparing this intonation to the reference intonations; and retrieving at least one of the reference emotional attitude.

It is also an object of the present invention to provide a method for indicating emotional attitude of a speaker according to intonation. This method comprises recording a speaker to obtain a sample of speech; processing the sample of speech to obtain digital data representing sound magnitude as a function of time; processing the digital data to obtain voice characteristics comprising a description of sound magnitude as a first function of frequency; decoding the voice characteristics to identify dominant tones; and attributing an emotional attitude to the speaker based on the determined dominant tones.

It is within the scope of the present invention to provide a method as defined above, wherein the step of retrieving further comprises interpolating between emotional attitudes according to intonations.

It is further within the scope of the present invention to provide a method as defined above, wherein the step of decoding further comprises calculating a maximum over a range of said first function of frequency to obtain a second function of frequency.

It is further within the scope of the present invention to provide a method as defined above, wherein the step of decoding further comprises calculating an average over a range of said first function of frequency to obtain a second function of frequency.

It is further within the scope of the present invention to provide a method as defined above, wherein the step of decoding further comprises calculating a maximum over a range of said second function of frequency to obtain an intonation.

It is further within the scope of the present invention to provide a method as defined above, wherein the step of retrieving further comprises determining the difference of the speaker's emotional attitudes from the reference emotional attitudes.

It is another object of the present invention to provide a method for indicating emotional attitudes of an animal, other than a human being, according to intonation. This method comprises defining a set of sounds that such an animal may emit, and obtaining a database comprising reference intonations, and reference emotional attitudes per each sound of said set of sounds; repeatedly producing at least one sound of the set of sounds by said animal; recording a plurality of these produced sounds to obtain a signal representing sound magnitude as a function of time; processing this signal to obtain sound characteristics; decoding these sound characteristics to identify an intonation; comparing the calculated intonation to the reference intonations; and retrieving at least one of the reference emotional attitude.

Another object of the present invention is to provide an automated, computer-based system for indicating the emotional attitudes of a speaker by automated intonation analysis. This system comprises the following components:

a. a sound recorder adapted to record a word that is repeatedly pronounced by the speaker, and to produce a signal representing the recorded sound magnitude as a function of time, b. a first processor, with processing software running on said processor, adapted for processing this signal, and obtain voice characteristics such as intonation, c. a database comprising an intonation glossary;

d. a second processor, with computing software running on said computer, adapted for collecting a set of predefined words, for retrieving relations between reference intonations and reference emotional attitudes per each word of said set of words from the database, for connecting to the processor, for comparing the a computed intonation to the reference intonations, and for retrieving at least one of the reference emotional attitudes; and e. an indicator connected to either the computer or the processor.

It is yet another object of the present invention to provide a method for advertising, marketing, educating, or lie detecting by indicating emotional attitudes of a speaker according to intonation. The method comprises obtaining a database comprising a plurality of vocal objects, such as words or sounds; playing-out a first group of at least one of these vocal objects for the speaker to hear; replying to said play-out by the speaker; recording this reply; processing this recording to obtain some voice characteristics; decoding these voice characteristics to identify an intonation; comparing this calculated intonation to the reference intonations; and playing-out a second group of at least one of the vocal objects for the speaker to hear again.

It is yet another object of the present invention to provide a system for indicating emotional attitudes of a speaker according to intonation, comprising a glossary of intonations relating intonations to emotions attitudes, and it is in the scope of the present invention for the glossary to comprise any part of the information listed in Table 1 herein below.

It is yet another object of the present invention to provide a method of providing remote service by a group comprising at least one observer to at least one speaker. This method comprises identifying the emotional attitude of a speaker according to intonation, and advising the observers how to provide said service.

It is in the scope of the present invention to provide such a method, wherein the step of advising comprises selecting at least one of said group of observer to provide the service.

BRIEF DESCRIPTION OF THE INVENTION

Figure 2:
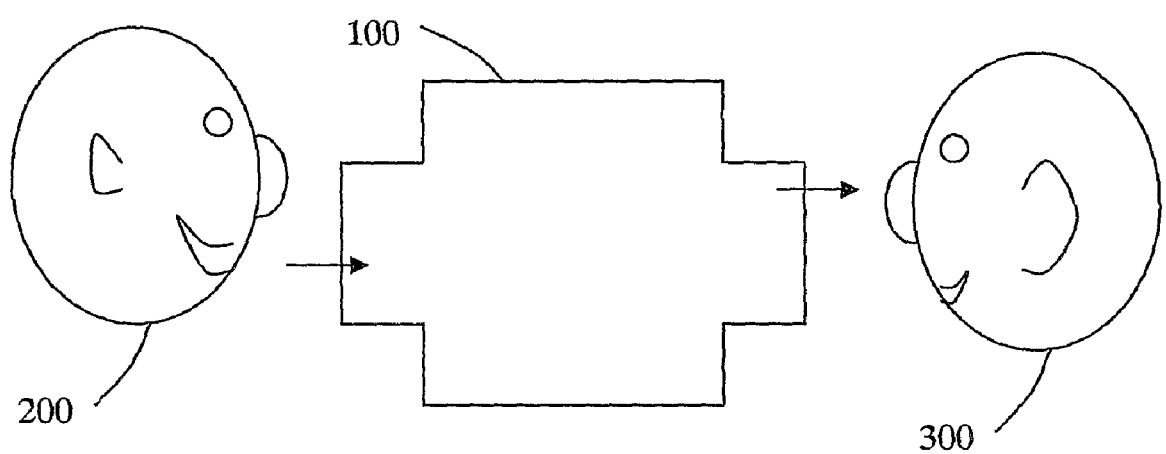
Figure 3:
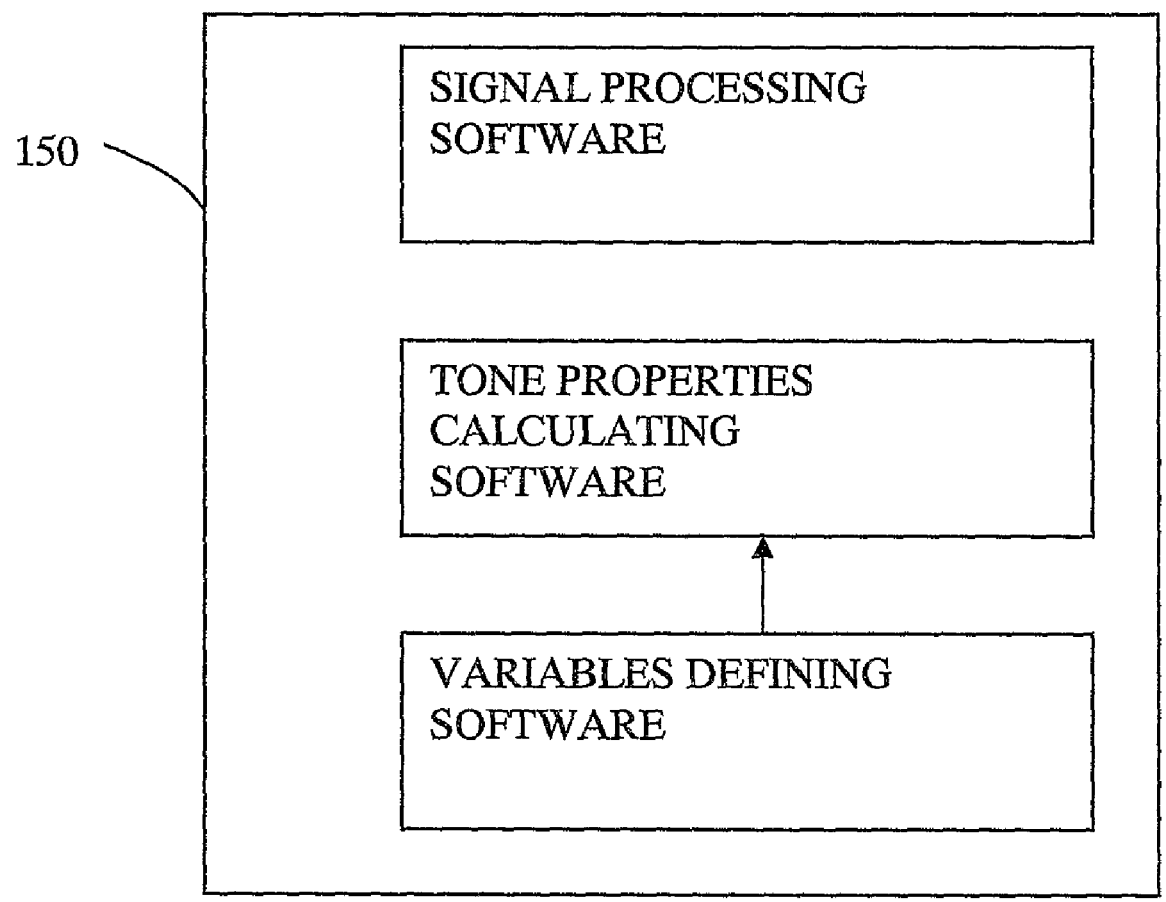
Figure 4:
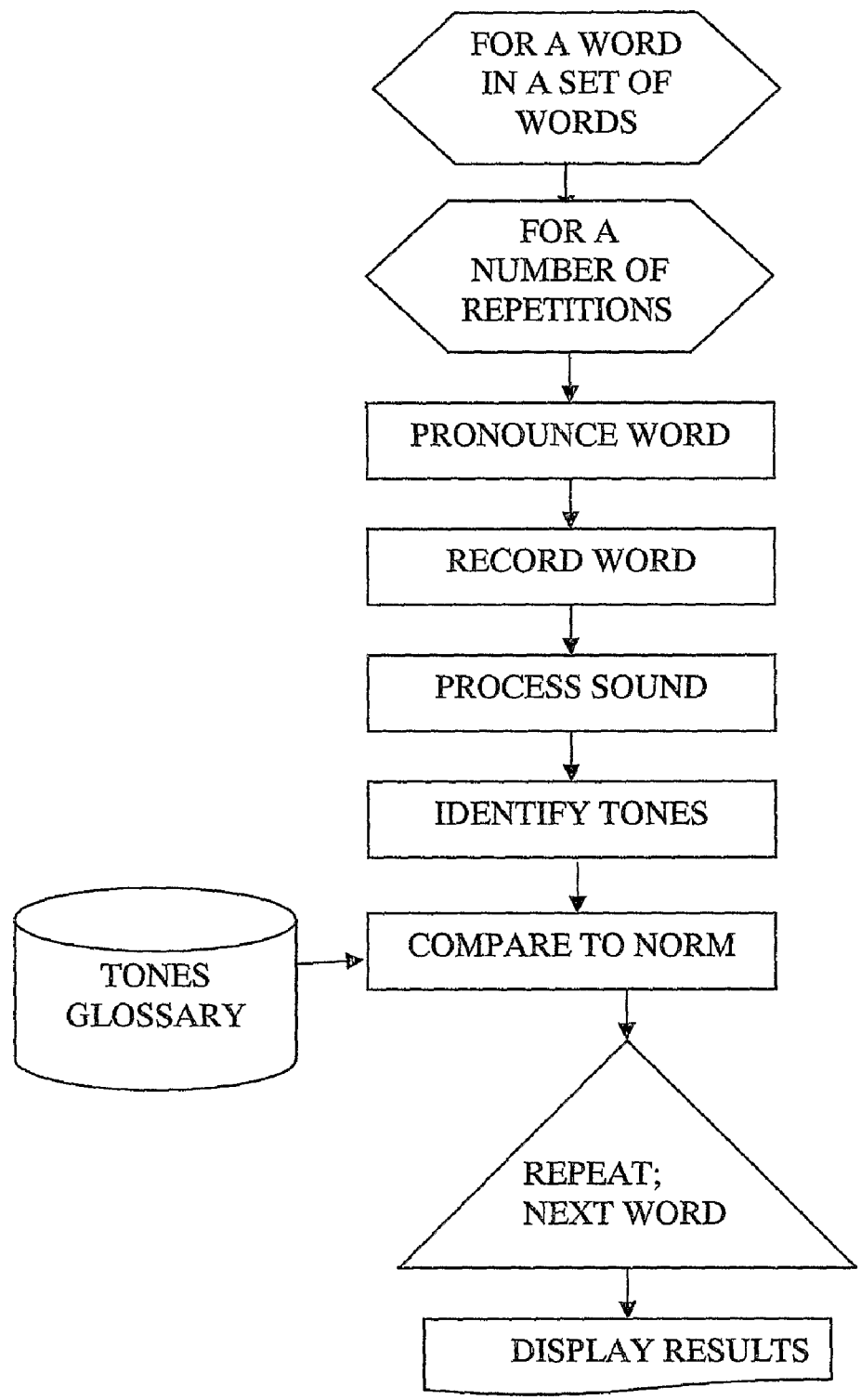

In order to understand the invention and to see how it may be implemented in practice, a preferred embodiment will now be described, by way of a non-limiting example only, with reference to the accompanying drawing, in which FIG. 1 schematically presents a system according to the present invention;

FIG. 2 schematically presents a system according to the present invention in use;

FIG. 3 schematically presents some of the main software modules in a system according to the present invention;

FIG. 4 schematically presents a method according to the present invention; and

Figure 5A:
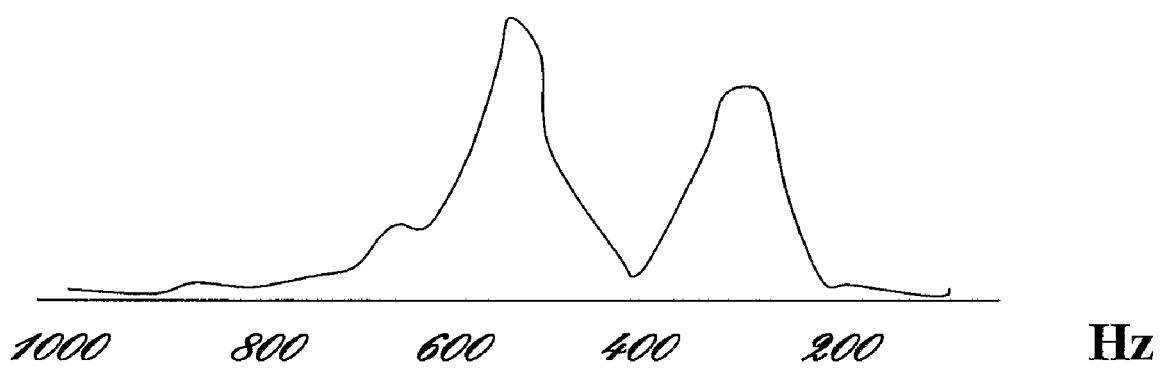
Figure 5B:
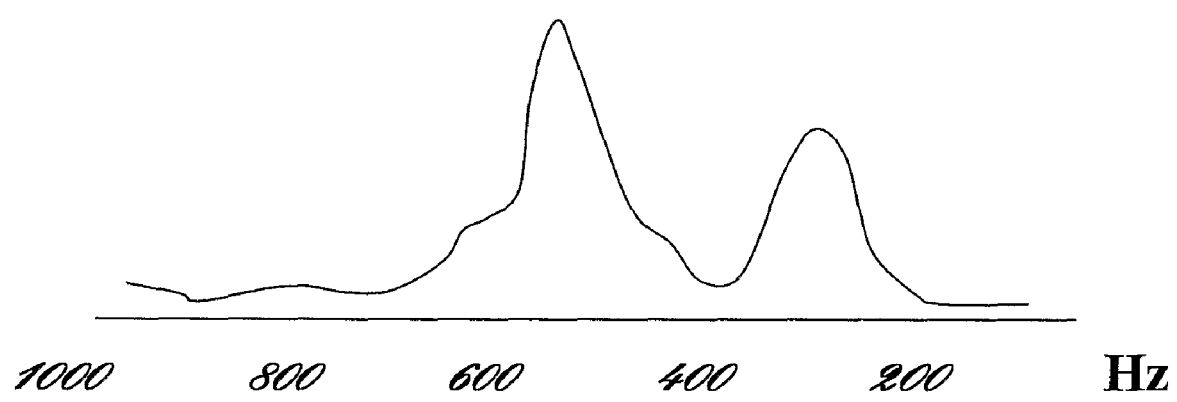

FIG. 5a and FIG. 5b elucidate and demonstrate intonation and its independence of language.

DETAILED DESCRIPTION OF PREFERRED EMBODIMENTS

The following description is provided, alongside all chapters of the present invention, so as to enable any person skilled in the art to make use of this invention. This description sets forth the best modes contemplated by the inventor for carrying out this invention, but various modifications will be apparent to those skilled in the art. The generic principles of the present invention have been defined specifically to provide an apparatus and methods for diagnosing emotional attitudes of a speaker according to intonation.

The term "word" refers in the present invention to a unit of speech. Words selected for use according to the present invention usually carry a well defined emotional meaning. For example, "anger" is an English language word that may be used according to the present invention, while the word "regna" is not; the latter carrying no meaning, emotional or otherwise, to most English speakers.

The term "tone" refers in the present invention to a sound characterized by a certain dominant frequency. Several tones are defined by frequency in Table 1 herein below. Among them, for example, are the tones named FA and SOL.

The term "intonation" refers in the present invention to a tone or a set of tones, produced by the vocal chords of a human speaker or an animal. For example the word "love" may be pronounced by a human speaker with such an intonation so that the tones FA and SOL are dominant.

The term "Dominant tones" refers in the present invention to tones produced by the speaker with more energy and intensity than other tones. The magnitude or intensity of intonation can be expressed as a table, or graph, relating relative magnitude (measured, for example, in units of dB) to frequency (measured, for example, in units of Hz.)

The term "reference intonation", as used in the present invention, relates to an intonation that is commonly used by many speakers while pronouncing a certain word or, it relates to an intonation that is considered the normal intonation for pronouncing a certain word. For example, the intonation FA-SOL may be used as a reference intonation for the word "love" because many speakers will use the FA-SOL intonation when pronouncing the word "love".

The term "emotional attitude", as used in the present invention, refers to an emotion felt by the speaker, and possibly affecting the behavior of the speaker, or predisposing a speaker to act in a certain manner. It may also refer to an instinct driving an animal. For example "anger" is an emotion that may be felt by a speaker and "angry" is an emotional attitude typical of a speaker feeling this emotion.

The term "reference emotional attitude", as used in the present invention, refers to an emotional attitude normally associated with the meaning of a certain word. For example, the word "baby" may be associated with reference emotional attitudes of affection.

The term "invoice characteristic", as used in the present invention, refers to a measurable quantity that can be calculated from a sample of recorded sound. For example the frequency of the sound carrying the most energy is a voice characteristic.

The term "decoding voice characteristic", as used in the present invention, refers to a calculation of voice characteristics, as derived from a sample of recorded sound, and the identification of the intonation expressed by this sample of recorded sound.

Research conducted by the applicants, looking at speakers of different languages, has found that certain words which contain an emotional value or meaning; such as love, happiness, hate, sadness, war, father, mother, baby, family, etc. have common cores of intonation throughout the languages examined and for the majority of speakers tested.

Our research revealed that each and every tone is associated with a common emotional attitude. Tone combinations are usually found to be universal. The results of our intonation analysis of spoken emotive words showed that principal emotional values can be assigned to each and every tone (as are described in Table 1 below). Table 1 divides the range of frequencies between 120 Hz and 240 Hz into seven tones.

These tones have corresponding harmonics in higher frequency ranges: 240 to 480, 480 to 960 Hz, etc. Per each tone, the table describes a name and a frequency range, and relates its accepted emotional significance.

TABLE 1

Glossary of Tones

| No. | Tone | Accepted Emotional Significance |
|---|---|---|
| 1. | DO (C) 128 Hz ± 8 Hz and all dyadic multiples | The need for activity in general and for survival activity in particular (defense, attack, work etc.) |
| 2. | RE (D) 146 Hz ± 8 Hz and all dyadic multiples | Impulsiveness and/or creativity (generally creativity, pleasure from food, sex, drink etc.) |
| 3. | MI (E) 162 Hz ± 8 Hz and all dyadic multiples | Self control, action within restraints |
| 4. | FA (F) 179 Hz ± 8 Hz and all dyadic multiples | Especially deep emotions such as love, hatred, sadness, joy, happiness. |
| 5. | SOL (G) 195 Hz ± 8 Hz and all dyadic multiples | Deep level inter-personal communication (intimacy) |
| 6. | LA (A) 220 Hz ± 10 Hz and all dyadic multiples | Speech out of profound conviction, referral to principles of reliability |
| 7. | SI (B) 240 Hz ± 10 Hz And all dyadic multiples | Tones of command and leadership, ownership or sense of mission |

After conducting extensive research, it was found by the inventors that certain combinations of these tones (listed and described above) serve as an intuitive basis for specific words. For example, the inventors found that the word "love", spoken in any one of the many languages examined, was pronounced by over 90% of the speakers using one of the following three intonations:

1. FA-SOL—(signifying, according to the table above, emotional communication);
2. SOL-RE—(signifying communication and impulsiveness); and
3. RE-FA—(signifying a combination of impulsiveness and emotion).

In addition to the three common intonations mentioned above, every speaker adds his or her own "personal" tones, probably signifying their individual attitude or their momentary attitudes in the given situation. Therefore, for example, adding the tone "SI" to the word "love" adds the notion of ownership to that person's perception of love.

The inventors offer, in a non-limiting manner, a suggested explanation for understanding these observations. Presuming the existence of certain centers of emotion in the brain, each responsible for a specific emotional state, it is plausible that every emotional center in the brain is associated with a certain tone, and vice versa, so that whenever a center is active and initiates a verbal emotional response, the tone that is associated with that active center in the brain is expressed together with the verbal response.

While studying sounds emitted by animals during various activities, it was found that specific tones are expressed during specific activities. For example, analysis of the sounds of songbirds mating calls showed an abundance of RE tones. Analyzing the lion's roar, on the other hand, showed an emphasis of the tone SI above the other tones. Or, in other words, SI is the tone expressed using a higher volume, or magnitude, when compared to the other tones.

These findings lead to the assumption that some genetic structure exists, shared partially or fully, by humans and animals, that is responsible for the observed universal language of tones.

The current invention is based on the analysis of human and animal sounds, the identification of emphasized tones and the development of insights and interpretations of the intended meanings. All those are based on the glossary of tones presented herein above.

Based on the decoding of the intonation, it is possible to conduct a number of commercially valuable activities. Those activities are selected in a non-limiting manner from the following:

1. Decoding a person's emotional positions, conscious and unconscious, for the purpose of intelligence, negotiations, improved dialogue, etc;
2. Psychoanalysis based on decoding intonation, serving as basis for therapeutic dialogue between therapist and patient;
3. Devices for games or for human and animal behavior research; and,
4. Aids for improving inter-cultural communication.

For example, an automated system could be built that will sample a speaker's voice and determine the emotional attitude of the speaker by: a) finding the dominant tones used by the speaker, b) comparing those dominant tones to a list of tones and their meanings (such as detailed in Table 1) and, c) making a determination about the nature of the emotional attitude of the speaker based on the tones used. Such a system could find many commercial applications. For example, such a system could help a salesperson better understand the character and/or the needs of his customer(s); whether the selling transaction is taking place over the phone or in person. Another useful application, for example, could be the use of an automated system, such as described above, to follow the emotional attitude of a caller and determine the nature of his base emotional attitude and whether his emotional attitude changes in the course of a phone conversation. Such a system, as just described, could aid in the improvement of customer service and in a retroactive analysis of customer calls for the purpose of improving future service. Another application, for example, could be the use of such a system to alert a supervisor about an on-going conversation between a customer and a company representative and the changing emotional attitudes of the customer during the conversation.

Another commercial example could be the use of one of the systems described herein to screen potential hires, by an employer, and conclude whether the speaker fits the demands of the job, with which co-workers the speaker could co-operate most productively and finally, which incentives could be best used by an employer to motivate the tested individual (speaker).

Reference is thus made now to FIG. 1, presenting a schematic and generalized presentation of the aforementioned novel system for indicating emotional attitudes of a speaker through intonation analysis [100]. Voice recorder [110] converts sound into a signal such as an electrical or optical signal, digital or analog. The voice recorder typically comprises a microphone. The signal is fed to computer or processor [120] running software code [150] which accesses database [140]. According to a specific embodiment of the present invention the computer comprises a personal computer. According to a specific embodiment of the present invention the computer comprises a digital signal processor embedded in a portable device. Database [140] comprises definitions of certain tones and a glossary relating tones to emotions. The results of the computation and signal processing are displayed by indicator [130] connected to the computer. According to one specific embodiment of the present invention, the indicator [130] comprises a visual display of text or graphics. According to another specific embodiment of the present invention, it comprises an audio output such as sounds or spoken words.

Reference is now made to FIG. 2, presenting a schematic and generalized presentation of the aforementioned novel system for indicating emotional attitudes of a speaker through intonation analysis [100] in action. Speaker [200] is repeating a certain word into the system and observer [300] is observing an indication of the emotional attitudes of the speaker.

Reference is now made to FIG. 3, presenting a schematic and generalized presentation of the software [150] of the aforementioned novel system for indicating emotional attitudes of a speaker through intonation. For the sake of clarity and brevity, infrastructure software, e.g. the operating system, is not described here in detail. The relevant software comprises three main components: 1) the signal processing component processes the audio signal received from the recorder and produces voice characteristics such as frequency, amplitude and phase, 2) the software component responsible for tonal characteristics calculations identifies the frequency ranges in which sound amplitude reaches maximum levels, and compares them to reference values found in a glossary of words and tones stored in the database 3) the variables definition software component defines the intonation specific to the speaker and defines the speaker's emotional attitudes accordingly.

Reference is now made to FIG. 4, presenting a schematic and generalized representation of the method for using intonation analysis to decipher the emotional attitudes of a speaker.

The method comprises inter alia the following steps, executed serially per each word pronounced, but can be executed in parallel for several words as a pipeline. First a word is selected, and then it is repeatedly pronounced by a speaker. This repetitive pronunciation is recorded in a digital format and the recorded voice is then processed to obtain sound characteristics. The obtained characteristics are further processed to identify the dominant tones. The obtained results are compared to a database of tones in order to obtain a reading on the corresponding emotional attitudes. The described process is repeated for several utterances of the same word, and also for several words, until finally some output is displayed indicating the results of the calculation. The displayed results include a description of the emotional attitudes of the speaker; optionally accompanied by some recommendations for further action. In the case that the calculated intonation is found similar to a specific reference intonation stored in the database, then a specific emotional attitude related to the specific reference intonation can be retrieved from the database.

Otherwise, emotional attitude can interpolated from stored values. For example, if a dominant tone is found for a certain word that is close to the mean frequency between two adjacent tones stored in the database, and two emotional attitudes are found in the database corresponding to these two tones, then the output may comprise the mixing of the attitudes in equal parts.

Reference is now made to FIGS. 5a and 5b, presenting some research data to elucidate and demonstrate the use of the present invention for indicating emotional attitudes of a speaker through intonation analysis. Both figures show a graph of relative sound volume versus sound frequency from 0 to 1000 Hz. Such sound characteristics can be obtained from processing sound as described in reference to FIG. 4, by signal processing software described in reference to FIG. 3, and by equipment described in reference to FIG. 1. The graphs are the result of processing 30 seconds of speech each. Dominant tones can be identified in FIGS. 5a and 5b, and the dominant tones in 5a are similar to those of 5b. Both graph result from speaking a word whose meaning is 'love'. The language was Turkish in case of FIG. 5a, and English for FIG. 5b. Thus these figures demonstrate the concept on dominant tones and their independence of language.

The following is a set of examples which illustrate a few best modes for practicing the present invention. These examples should not be construed as limiting. In the first example a personal computer comprising a CPU made by Intel™ is running the Windows XP™ operating system made by Microsoft™. The personal computer is equipped, inter alia, with a CRT monitor display and a socket accepting a plug connected to a microphone as is commercially available from numerous manufactures, for example Dell™. The computer is also equipped with a hard disk and solid state memory. The computer is optionally connected to a network such as the internet. The operating system handles these peripherals and provides services from the software described herein below. The software is written in a programming language such as C++ and compiled using tools such as Code Warrior™ by Symantec™ or Visual Studio™ by Microsoft™. Alternatively, the code is written in an interpreted language such as Basic or Matlab™ and is interpreted as it runs.

A set of words is selected in a language spoken by a speaker [200]. The words are selected so that they carry some emotional value to the speaker. The process described herein below is repeated for each word in the set. An English language example comprises the following words: love, hate, happiness, mother, father, baby, dream, jealousy, anger.

The speaker pronounces the word in front of a microphone. The speaker repeats pronouncing the same word several times, at least twice and preferably about 10 times. The voice of the speaker is recorded. The microphone translates it to an electrical signal which is accepted by the computer, converted to digital form and stored either temporarily or permanently. In the case of permanent storage, a file may be written in the hard drive or transmitted elsewhere through the network. WAV and MP3 are well known examples of file formats for storing voice recordings.

The recorded voice data is analyzed by the following two software modules, possibly working in parallel as a pipeline of operations, and possibly also in parallel with the recording of the pronunciations of further words. A first software module analyzes the voice data and calculates the following two voice characteristic functions. Function A is the maximum of sound volumes as a function of the sound frequencies, where the frequencies range, for example, 0 to 3500 Hz, and function B is the average of sound volume for each and every frequency in such a range. The range is sampled at a reasonable rate, for example one sample per one Hz. A second software module calculates the maximum points of functions A and B, and creates the order of tone emphasis according to the following algorithm. Tone No. 1 is the tone projecting to the frequency at which the global maximum point of function B is received. Tone No. 2 is the tone for which the greatest amount of maximum points was registered for function B, i.e. the same tone appears as the maximum tone on several octaves, and this number of octaves is higher than for any of the other tones. Tone No. 3 is the tone projecting to the frequency at which the second-highest maximum point is received, i.e., after deducting the points attributed to tone No. 1 and tone No. 2. Tone No 4 is the tone projecting to the frequency at which the third-highest maximum point in function B is received, i.e., after deducting the points attributed to tones 1, 2 and 3. Tone No. 5 is the tone projecting to the frequency at which the fourth-highest maximum point in function B is received, in condition that it is also received as the maximum point of function A.

This group of five tones is compared to a standard group of tones calculated in advanced, which is called herein "the norms". The norms are a part of a database available to the software. It may reside in the computer's permanent storage, or it may be available through the network. Based on closest correspondence, the most suitable characteristic is defined. Any deviations, e.g., addition or absence of tones, are also defined per spoken word and are added or deducted from the above characterization. Finally, some indication of emotional attitude, possibly with recommendations for further action, are presented an observer, or the speaker's attitude examiner, who may a clinical psychologist, the speaker himself or herself, a scientific researcher, etc. The indication is given through the CRT display, or as spoken words through a loudspeaker, or possibly sent as a message through the network.

In the second example the personal computer is replaced by a mobile device equipped with a microphone and display means, as well as processing power and memory, and possibly connection to a network, for example a mobile cellular telephone.

In the third example the system resembles that of the first example, but the speaker is actually an animal such as a mammal or a bird. In this case the database comprises a glossary of tones corresponding to similar animals, for example animals of the same species and/or gender. The glossary is composed by recording several similar animals at similar behavioral situations, and identifying the core, norm, or reference tones.

In the fourth example the system of the first example is expanded by storing some recordings of reference words as sounds, and playing-out these words through a loudspeaker or earphones plugged to the personal computer, so that the speaker may hear them. This feature creates a form of conversation.

In the fifth example the system is split between two location and connected via the telephone network. The speaker is located at a first location and is speaking into a telephone receiver. The rest of the system is located at a second location and supplies an observer with an indication of the speaker's emotions. For example, the system is located at a service center and the observer provides some service to the speaker. The system provides the observer with a profile of the personality of the speaker enabling the observer to give optimal service. The system may recommend course of action to the observer or even select between observers so that the speaker receives optimal service from the observer best equipped of train to deal with his or her specific condition. For example, speakers may be roughly divided into three groups: early adopters, conservatives and survivors, and the service may be dealing with complaints about equipment malfunction. When a speaker is complaining about a malfunction, the system may indicate which replies the speaker may find acceptable. An early adopter may accept the answer that the equipment is state-of-the-art and thus not yet free of problems. A conservative may accept the answer the equipment is the most commonly used, and its failure rate is acceptable by most users, and a survivor may need to be shown ways of working around the malfunction. Mixing answers between personality types may increase the tension between speaker (customer) and observer (service provider) typical of this situation. The present invention allows for best service for the benefit of both parties.

The invention claimed is:

1. A method for indicating emotional attitudes of a speaker according to voice tone, said method comprising:
   a. obtaining a database comprising reference tones and reference emotional attitudes corresponding to each of said reference tones;
   b. pronouncing at least one word by a speaker for the duration of a sample period;
   c. recording said at least one word so as to obtain a signal representing sound volume as a function of frequency for said sample period;
   d. processing said signal so as to obtain voice characteristics of said speaker, wherein said processing includes determining a Function A, said Function A being defined as the average or maximum sound volume as a function of sound frequency, from within a range of frequencies measured in said sampled period, and wherein said processing further includes determining a Function B, said Function B defined as the averaging, or maximizing of said function A over said range of frequencies and dyadic multiples thereof;
   e. comparing said voice characteristics to said reference tones so as to indicate at least one of said reference emotional attitudes.

2. A method according to claim 1, wherein said step of processing additionally comprises identifying at least one dominant tone, and attributing an emotional attitude to said speaker based on said at least one dominant tone.

3. A method according to claim 2, wherein said step of processing comprises calculating a plurality of dominant tones, and comparing said plurality of dominant tones to a plurality of normal dominant tones specific to a word or set of words pronounced by said speaker so as to indicate at least one emotional attitude of said speaker.

4. A method according to claim 1, wherein said range of frequencies is between 120 Hz and 240 Hz and all dyadic multiples thereof.

5. A method according to claim 1, wherein said step of comparing further comprises calculating the variation between said voice characteristics and tone characteristics related to said reference tones.

6. A method according to claim 1, wherein said step of comparing further comprises determining the difference of said speaker's emotional attitudes from said reference emotional attitudes.

7. A method for indicating emotional attitudes of an animal, said method comprising:
   a. defining a set of sounds that an animal produces;
   b. obtaining a database comprising reference tones and reference emotional attitudes for each sound of said set of sounds for each of said reference tones;
   c. producing, by said animal, at least one sound of said set of sounds;
   d. recording said at least one sound produced by said animal for the duration of a sample period so as to obtain a signal representing sound volume as a function of frequency for said sample period;
   e. processing said signal so as to obtain sound characteristics, wherein said processing includes determining a Function A, said Function A being defined as the average or maximum sound volume as a function of sound frequency, from within a range of frequencies measured in said sample period, and wherein said processing further includes determining a Function B, said Function B defined as the averaging, or maximizing, of said function A over said range of frequencies and dyadic multiples thereof
   f. comparing said sound characteristics to said reference tones so as to indicate at least one reference emotional attitude.

8. A system for indicating at least one emotional attitude of a speaker using voice tone analysis, said system comprising:
- a. a sound recorder adapted to record a word or set of words that is repeatedly pronounced by a speaker for the duration of a sample period, and to produce a signal representing sound volume as a function of frequency for said sample period,
- b. processing means coupled to said recorder, for processing said signal so as to obtain voice characteristics relating to the tone of said speaker, wherein said voice characteristics includes a Function A defined as the average or maximum sound volume as a function of sound frequency from within a range of frequencies measured in said sampled period and a Function B defined as the averaging, or maximizing of said function A over said range of frequencies and dyadic multiples thereof;
- c. a database comprising a plurality of reference tones and emotional attitudes corresponding to each of said reference tones for allowing indicating of at least one emotional attitude of said speaker through comparison of said voice characteristics to said reference tones.

9. The system of claim 8, wherein said voice characteristics further includes at least one dominant tone.

10. The system of claim 9, wherein said voice characteristics includes five dominant tones, and wherein said five dominant tones are compared to five normal dominant tones specific to said word or set of words pronounced by said speaker so as to indicate at least one emotional attitude of said speaker.

11. The system of claim 8, wherein said plurality of reference tones comprises;
- a. tone "DO", corresponding to frequency range 128 Hz+−8 Hz and all dyadic multiples thereof, and corresponding to an emotional attitude generally representing the need for activity in general and for survival activity in particular;
- b. tone "RE" corresponding to frequency range 146 Hz+−8 Hz and all dyadic multiples thereof and corresponding to an emotional attitude generally representing impulsiveness and/or creativity;
- c. tone "MI" corresponding to frequency range 162 Hz+−8 Hz and all dyadic multiples thereof and corresponding to an emotional attitude generally representing self-control, and action within restraint;
- d. tone "FA" corresponding to frequency range 172 Hz+−8 Hz and all dyadic multiples thereof and corresponding to an emotional attitude generally representing especially deep emotions such as love, hatred, sadness, joy and happiness;
- e. tone "SOL" corresponding to frequency range 192 Hz+−8 Hz and all dyadic multiples thereof and corresponding to an emotional attitude generally representing deep level inter-personal communication;
- f. tone "LA" corresponding to frequency range 220 Hz+−10 Hz and all dyadic multiples thereof and corresponding to an emotional attitude generally representing speech out of profound conviction and referral to principles of reliability;
- g. tone "SI" corresponding to frequency range 240 Hz+−10 Hz and all dyadic multiples thereof and corresponding to an emotional attitude representing command, leadership, ownership, or a sense of mission.

12. The system of claim 8, for use in advertising.

13. The system of claim 8, for use in educating individuals to assess the emotional attitudes of others through voice tone.

14. The system of claim 8, for use in providing an improved service to a speaker based on the results of analysis of at least emotional attitude of said speaker.

* * * * *